United States Patent
Sesay et al.

(10) Patent No.: US 6,454,961 B1
(45) Date of Patent: Sep. 24, 2002

(54) ELIXIR FOR INDUCING HIGH-SPEED SETTLEMENT OF PRECIPITATES

(75) Inventors: Sahid Sesay, Alameda, CA (US); Edison Mbayo, San Jose, CA (US)

(73) Assignee: Baffin, Inc., Alameda, CA (US)

( * ) Notice: Subject to any disclaimer, the term of this patent is extended or adjusted under 35 U.S.C. 154(b) by 23 days.

(21) Appl. No.: 09/664,637

(22) Filed: Sep. 19, 2000

(51) Int. Cl.⁷ .................................. C02F 1/56
(52) U.S. Cl. ................ 252/180; 210/728; 210/734; 524/922
(58) Field of Search ................ 210/725, 727, 210/728, 732, 733, 734, 735, 736; 252/180, 181; 524/922

(56) References Cited

U.S. PATENT DOCUMENTS

| | | | | |
|---|---|---|---|---|
| 3,409,546 A | * | 11/1968 | Mogelnicki et al. | 210/728 |
| 3,509,021 A | * | 4/1970 | Woodward | 162/167 |
| 3,835,084 A | * | 9/1974 | Azorlosa et al. | 210/728 |
| 3,994,806 A | * | 11/1976 | Rausch et al. | 210/734 |
| 4,588,508 A | * | 5/1986 | Allenson et al. | 210/708 |
| 4,835,206 A | * | 5/1989 | Farrar et al. | 524/457 |
| 5,213,693 A | * | 5/1993 | McGrow et al. | 210/728 |
| 5,707,532 A | * | 1/1998 | Guerro et al. | 210/727 |
| 6,117,938 A | * | 9/2000 | Farinato et al. | 524/801 |
| 6,120,690 A | * | 9/2000 | Haase | 210/728 |
| 6,235,205 B1 | * | 5/2001 | Huang et al. | 210/723 |

* cited by examiner

Primary Examiner—Peter A. Hruskoci
(74) Attorney, Agent, or Firm—Lyon & Lyon LLP

(57) ABSTRACT

An elixir to aid in the coagulation and flocculation of metal precipitates in wastewater, and to aid in their settling out of the wastewater solution, comprising: 1) a first cationic polyelectrolyte, 2) a solution comprising a second cationic polyelectrolyte, an acrylamide, and a cationic monomer, 3) a polymer with a high molecular weight and a high charge density, and 4) water.

4 Claims, No Drawings

ELIXIR FOR INDUCING HIGH-SPEED SETTLEMENT OF PRECIPITATES

FIELD OF THE INVENTION

This invention pertains to the field of removing contaminants from a liquid, including, more specifically, removing heavy metals from industrial wastewater.

BACKGROUND OF THE INVENTION

Many industrial processes produce wastewater streams that are laden with contaminants. These industrial processes include, among others, electroplating, galvanizing, anodizing, chelating, metal finishing, printed circuit board (PCB) manufacturing, semiconductor, magnetic disk manufacturing, mining operations, photo processing, fungicide manufacturing, food preparation, paper and pulp, textile, and oil refining. The wastewater streams of these different processes may contain any number of contaminants, including heavy metals, organic wastes, and inorganic wastes. In regard to heavy metal contaminants, they generally include, but are not limited to, metals such as copper, iron, gold, lead, nickel, silver, tin, zinc, chromium, cadmium, and arsenic.

The presence of these metals in wastewater causes the wastewater to be highly toxic. They can make the wastewater corrosive, inflammable, and even explosive. Due to the toxicity of metal laden wastewater, it poses a real danger of damaging wastewater collection systems, such as publicly owned treatment works (POTW), and of harming the environment.

In order to address the risks that metal laden wastewater presents, strict regulations have been imposed on plants regarding their wastewater discharges. Various agencies currently set maximum limits on the quantity of metals that plants may discharge into their waste streams. Where a plant discharges its wastewater to a POTW, these maximum limits are set either by the POTW itself, or by a municipal agency. And where a plant is discharging its wastewater directly to the environment, the maximum limits are typically set by state regulatory agencies and/or the Environmental Protection Agency.

Because of this need to minimize the quantity of metals discharged, plants treat their wastewater streams to remove the majority of the metals present. Since each metal has an optimum pH at which it will precipitate out of wastewater, plants have conventionally removed these metals individually using hydroxide precipitation over a series of pH adjustments, or by segregating waste streams that contain different metals and treating them individually. At each pH adjustment, at least one metal present in the wastewater will react with the treatment chemicals that have been added and will precipitate out of the wastewater. The metal precipitates must also be given a sufficient amount of time to settle out. The wastewater is then moved to another tank for the next pH adjustment. The wastewater must be moved to a new tank because once the pH level is changed, the metal that was just removed will have a tendency to re-dissolve back into solution.

For example, metals such as iron precipitate out of solution at lower pH levels, while metals such as nickel and cadmium precipitate out at higher pH levels. At a lower pH level, iron will precipitate out of solution, but if the pH level is then increased in order to remove other metals, the iron will dissolve back into solution. To solve this problem the wastewater is typically moved to a new treatment tank after a pH adjustment, leaving behind the metal that just precipitated out.

One drawback of known treatment processes is the length of time the precipitation of metals normally takes. Known methods chemically treat each metal separately, which requires many pH adjustments. In addition, the use of existing coagulants in known systems causes the metals to settle out slowly. Furthermore, known systems typically require a final pH adjustment prior to discharge. Thus the end result of all of these potential bottlenecks is that the entire operation may take anywhere from several hours to several days to complete.

Another drawback of known treatment systems is that when a plant generates several waste streams that each contain different metals, the waste streams are treated separately due to the problems involved in treating wastewater with multiple metals. This either forces a plant to implement more than one wastewater treatment system, or forces a plant to treat its waste streams one at a time. These limited options cause the plant to incur additional time and expense to treat all of its wastewater.

The fact that these processes can also be labor-intensive adds another source of time consumption. For example, plant operators often have to manually determine pH levels and manually add acid or base to adjust the pH levels, especially when spikes in metal concentrations occur. In addition, the chemicals that are added to the wastewater to precipitate out the metals can be in either solid or liquid form. This makes the addition of these chemicals into treatment tanks a more time-consuming process because operators typically add the solid chemicals manually, or have to initially mix the solid chemicals into clean water prior to adding it into the wastewater.

Another drawback to known systems is the fact that a plant's treatment process normally has to be tailored to the specific composition of that individual plant's wastewater so that it effectively removes the metals present. Generally, plants cannot simply implement an "off-the-shelf" process for treating their wastewater. Instead, plants typically have to design a treatment process around their effluent streams. This means that in the event of a system upset, for example higher levels of a metal or the introduction of a new metal in the wastewater, the treatment process will typically be less effective or ineffective altogether. The unfortunate result of this may be an unlawful discharge of metals. Thus, plants must continuously monitor the composition of their wastewater streams and modify the treatment processes and the chemicals they use to effectively treat their wastewater.

Other drawbacks of known systems relate to flocculation and coagulation when known flocculants and coagulants are mixed into the wastewater. Coagulation is the process of combining the suspended metal solids, typically in the form of colloids or flocs, into larger and heavier particles. These larger particles become too heavy to remain suspended in the wastewater and drop to the bottom of the solution. A slightly different process that has similar results is flocculation, which is the process of physically trapping and/or linking the flocs together, typically through the use of a polymer. In known systems, one drawback is that most polymers are supplied in powder form, requiring the users to mix the powder into water prior to adding it into the wastewater. This is labor-intensive and time consuming process. Another drawback is that when flocculants are mixed into the wastewater, their flocculation effects are retarded by the mixing blades which tend to break-up the flocs that form. This results in sludge which is difficult to remove from the wastewater and from filters. In addition, the difficulty of removing sludge from filters is exacerbated by the fact that often, due to the use of high quantities of lime, the sludge is slimy and clings to filters, resulting in a high filter replacement rate.

Accordingly, there is a need for a process to remove metals from wastewater that is less time consuming and does not need to be specifically tailored for the wastewater composition of each plant in which it is used, and that also addresses the other drawbacks of known systems that were mentioned above.

SUMMARY OF THE INVENTION

The present invention is a liquid chemical formulation that addresses some of the problems with known systems mentioned herein. Specifically, the elixir of the present invention is a highly active cationic polymer that preferably comprises: 1) a first cationic polyelectrolyte; 2) a combination of a second cationic polyelectrolyte, an acrylamide, and a cationic monomer; 3) a polymer with a high molecular weight and a high charge density; and 4) water.

The elixir of the present invention causes a number of varying reactions to occur in wastewater that ultimately result in the removal of heavy metals. The main function of the elixir is to aid in the coagulation and flocculation of metal precipitates in wastewater, and in the settling out of metal precipitates from the wastewater solution. The elixir accomplishes this by bonding to the precipitated metals and aggregating them into larger particles that are too large to remain suspended in solution.

It is important to note that other reactions in the wastewater may also occur due to the elixir of the present invention, and the reactions outlined herein should be construed as exemplary and not as being the only reactions that occur. Furthermore, although this specification addresses the removal of metals from wastewater, the elixir of the present invention may also be used to remove other contaminants, including organic and inorganic contaminants.

DETAILED DESCRIPTION OF THE INVENTION

The elixir of the present invention preferably comprises a mixture of three different polymeric coagulants, all of which are preferably added to a relatively large quantity of water. The first polymeric coagulant preferably comprises a cationic polyelectrolyte. In a presently preferred embodiment of the present invention, the cationic polyelectrolyte is a cationic polyacrylamide. More preferably the cationic polyelectrolyte is water-soluble in an emulsion, that has a pH of between 6–8 at a dilution of 5 grams/liter, a flash point greater than one hundred degrees Celsius, an autoignition temperature greater than two hundred degrees Celsius, and a vapor pressure of 0.133 millimeters of mercury at twenty degrees Celsius. It is presently preferred that the cationic polyelectrolyte utilized is the commercially available chemical CLARIFLOC C310, which has the properties described above, produced by Chemtall, Inc. of Riceboro, Ga.

The second polymeric coagulant preferably comprises a mixture of a cationic polyacrylamide, an acrylamide, and a cationic monomer. In a presently preferred embodiment, the mixture is water-soluble, and has a pH of between 3–5 at a dilution of 5 grams/liter. It is presently preferred that the mixture utilized is provided by the commercially available chemical F04498SH, produced by Chemtall, Inc. of Riceboro, Ga.

And the third polymeric coagulant is preferably a liquid emulsion cationic polymer with a high molecular weight and high charge density. In a presently preferred embodiment, liquid emulsion cationic polymer includes petroleum distillates hydrotreated light of between fifteen and thirty percent. The presently preferred liquid emulsion cationic polymer has a boiling point of ninety-three point thirty-three degrees Celsius, a specific gravity of 1.03, and a flash point of sixty-two point seventy-seven degrees Celsius. It is presently preferred that the liquid emulsion cationic polymer utilized is the commercially available chemical FLOCULITE 402, produced by DuBois Chemicals of Cincinnati, Ohio, is used in the formulation of the elixir.

The polymer solution tends to aid in flocculation of suspended solids in two ways. First, it tends to establish ionic links between the flocs that are suspended in the wastewater. The suspended flocs generally have a negative surface charge associated with them, causing the flocs to repel one another and preventing them from forming larger particles on their own. The polymer solution, which is preferably composed of cationic polyelectrolytes, typically has a positive charge which attracts the negatively changed flocs and acts as a "bridge" between the negative flocs. Second, the cationic polyelectrolytes may neutralize the negative surface charges of the flocs, allowing the flocs to aggregate into larger particles. These two actions result in the flocs forming larger particles that can drop out of the wastewater.

The elixir of the present invention is preferably produced by a batch process. The following is a preferred description of the method for manufacturing a forty-five gallon batch of the elixir. The quantities given may be scaled up or down depending on the needs of a user.

The manufacturing process preferably takes place in a forty-five gallon (204.57 liter) mixing tank with mechanical mixers. The first step is to fill the mixing tank with approximately ten gallons of warm water. Next, the mixers are turned on at a slow rate.

The first ingredient, CLARIFLOC C310, is then mixed into the water. Preferably, approximately 0.341 liters of the CLARIFLOC C310 is added. After the CLARIFLOC C310 has been added, the speed of the mixer is preferably increased, and the resulting solution is mixed until the CLARIFLOC C310 is completely dispersed in the water.

Next, the second ingredient, F04498SH, is added while continuing to run the mixer. Preferably, approximately 265 grams of F04498SH is added. Once the F04498SH has been added, preferably the solution continues mixing until the F04498SH is dispersed.

The third ingredient, COAGULITE 402, is added next. This compound is preferably added slowly to the solution. Preferably, approximately 0.341 liters of COAGULITE 402 is used for the elixir. After adding the COAGULITE 402, the resulting solution is mixed until the COAGULITE 402 is dispersed. After this mixing period, the speed of the mixer is preferably reduced.

Finally, water is added to bring the volume of the solution to forty-five gallons, or 204.57 liters. Upon completion of this process, one liter of the elixir of the present invention will generally comprise approximately 1.67 ml of CLARIFLOC C310, approximately 1.297 g of F04498SH, and approximately 1.67 ml of COAGULITE 402. Preferably, the ratio of CLARIFLOC C310:COAGULITE 402:F04498SH should be approximately 0.01 to 2.0 ml:0.01 ml to 2.0 ml: 0.01 to 2.0 grams.

It will be appreciated by those of ordinary skill in the art of wastewater treatment that elixirs prepared simply by substituting solutions that are chemically similar to CLARIFLOC C310, F04498SH, or COAGULITE 402 into the present invention will still be encompassed within the scope of the claims. Accordingly, the above description should be construed as illustrative, and not in a limiting sense, the scope of the invention being defined by the following claims.

What is claimed is:

1. An elixir for treating wastewater, consisting essentially of:
   a mixture of water;
   a cationic polyelectrolyte comprising a cationic polyacryllamide which is water-soluble in an emulsion;
   a solution comprising a cationic polyacrylamide, an acrylamide, and a cationic monomer; and
   a liquid emulsion comprising a cationic polymer and hydrotreated light petroleum distillates in a ratio of between 15 to 30 percent by weight.

2. The elixir of claim 1, wherein 0.01 to 2.0 milliliters of the cationic polyelectrolyte is used for every one gram of the solution that is used.

3. The elixir of claim 1, wherein 0.01 to 2.0 milliliters of the liquid emulsion cationic polymer is used for every one gram of the solution that is used.

mixing the cationic polyelectrolyte into the water;
   mixing the solution into the water; and
   mixing the liquid emulsion into the water.

4. A method of manufacturing the elixir of claim 1, comprising:
   adding water to a mixing tank;
   mixing the cationic polyelectrolyte into the water;
   mixing the solution into the water; and
   mixing the liquid emulsion into the water.

* * * * *